Jan. 30, 1968  SHIGEO TAKEKAWA  3,366,528
METHOD OF MANUFACTURING A THIN WATER-PROOF ELASTIC
FABRIC HAVING A PILE FACE, AND PRODUCT
Filed June 6, 1966

Jan. 30, 1968  SHIGEO TAKEKAWA  3,366,528
METHOD OF MANUFACTURING A THIN WATER-PROOF ELASTIC
FABRIC HAVING A PILE FACE, AND PRODUCT
Filed June 6, 1966  4 Sheets-Sheet 3

Jan. 30, 1968  SHIGEO TAKEKAWA  3,366,528
METHOD OF MANUFACTURING A THIN WATER-PROOF ELASTIC
FABRIC HAVING A PILE FACE, AND PRODUCT
Filed June 6, 1966  4 Sheets-Sheet 4

United States Patent Office 3,366,528
Patented Jan. 30, 1968

3,366,528
METHOD OF MANUFACTURING A THIN WATER-PROOF ELASTIC FABRIC HAVING A PILE FACE, AND PRODUCT
Shigeo Takekawa, 1445, 2-chome Nagatamachi, Nakano-ku, Tokyo, Japan
Continuation-in-part of application Ser. No. 175,714, Feb. 26, 1962. This application June 6, 1966, Ser. No. 560,368
8 Claims. (Cl. 161—67)

ABSTRACT OF THE DISCLOSURE

An elastic fabric and method of manufacturing the fabric which includes bonding a lower side of a knit cloth to an elastic material, stretching the bonded cloth and elastic material whereby the loops of the upper side of the knit cloth are disengaged from one another, and releasing the stretched cloth and material so as to return the material and cloth to a non-stretched condition whereupon the freed loops of the upper side of the knit cloth stand closely packed and form a pile-like surface.

Background of the invention

This application is a continuation-in-part of my prior application Ser. No. 175,714, filed Feb. 26, 1962, now abandoned, and relates to a method of manufacturing thin water-proof elastic fabrics and more particularly to a method of manufacturing an elastic pile fabric wherein a double-knit construction of the type shown in U.S. Patent 1,636,943 to Rothman dated July 26, 1927, or similar textured hosiery knitting, is secured to an elastic layer in such a manner that the top stitches in the double-knit construction form the pile of the fabric and are free from securement to the elastic layer, whereby the pile is free from direct influence of tension when the elastic layer is stretched.

The elastic layer may consist of a rubber or polyvinyl chloride sheet pasted on one side of the double-knit construction, or it can be either a latex solution or synthetic resin solution applied to one side of the double-knit construction with the elasticity imparted thereto by either vulcanizing or heat-treating the same.

Briefly, the method for manufacturing the elastic fabric of the present invention comprises: (1) Bonding a double-knit construction fabric to a thin sheet of elastic material in such a manner that only the loops of a lower side are secured to the face of the elastic sheet; (2) stretching the double-knit construction and material a sufficient amount to pull the upper side loops in one course through the loops in the adjacent course to thereby provide freed loops, which form the pile of the finished fabric; and (3) releasing the stretching force from the double-knit construction to thereby contract the elastic sheet causing the loops to stand upright and to be closely packed to form a pile-like surface.

Heretofore, various types of water-proof textile fabrics have been proposed wherein a fabric is bonded to an elastic sheet; however, these fabrics have been objectionable due to the non-extensibility of the textile employed. For instance, a thin water-proof textile fabric has been proposed wherein a suitable cloth is adhered to a rubber or vinyl sheet. These fabrics have provided a certain degree of water-proofness and insulating properties; however, they do not have a sufficient elasticity due to the non-extensibility of the cloth employed. Thus, they have been found inadequate for use as clothing such as raincoats or underwear.

The thin water-proof fabric of the present invention has been devised to overcome the disadvantages noted above in hitherto employed water-proof fabrics, and comprises essentially a double-knit construction bonded to an elastic sheet in such a manner that the finished fabric is provided with a substantial degree of elasticity in all directions.

An object of the present invention is to provide an improved method for manufacturing thin water-proof elastic fabrics.

Another object of the present invention is to provide an improved method for manufacturing an elastic pile-like fabric wherein a double-knit construction is secured on one side to an elastic layer in such a manner that the stitches of the other side form the pile of the fabric and are free from securement to the elastic layer, whereby the pile is free from direct influence of tension when the elastic layer is stretched.

Other objects and advantages of the present invention will become apparent from the following description of a preferred embodiment, taken in connection with the accompanying drawings wherein.

Figure 1:
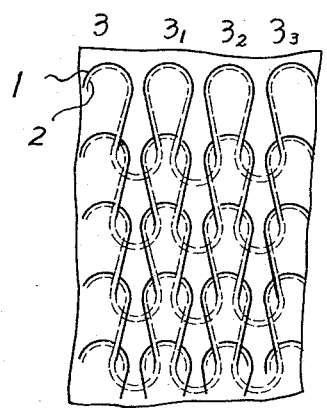
FIG. 1 is a plan view of a double-knit cloth or construction bonded on one side to a face of an elastic sheet.
Figure 2:
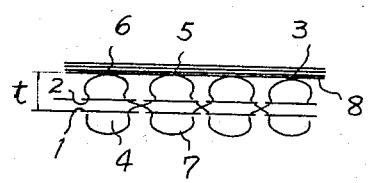
FIG. 2 is a diagrammatic end view of the elastic fabric illustrated in FIG. 1 showing the relationship of the stitches forming each side of the double-knit cloth relative to the elastic sheet.
Figure 6:
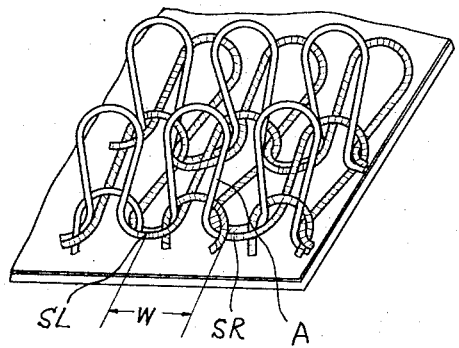
FIG. 6 is an enlarged, fragmentary, perspective view of the elastic water-proof fabric of the present invention.

Referring to the drawings and more particularly to FIGS. 1, 2 and 6, a knitting yarn 1 of a wale 3 forms a top stitch 4, the sinker loop S of which is then passed around to the back side to form a bottom stitch 5 on wale $3_1$. Similarly, a separate knitting yarn 2 on wale 3 forms a bottom stitch 6 which is overlapped by top stitch 4. The sinker loop of bottom stitch 6 is passed around to the top side to form a top stitch 7 on wale $3_1$ overlapping the bottom stitch 5. These operations are repeated alternately to produce a knit construction having an upper side formed of top stitches, and a lower side formed of bottom stitches.

By this construction and arrangement the stretching of bottom stitches, as shown in FIG. 2, is made possible and simultaneously, the disengagement of engaged loops from one another in adjacent courses of the upper side is ensured in order to convert the loops to pile-like textile fabrics. Furthermore, the curved portion of disengaged loops are utilized as a limitation for the adjustment of stretch and contraction of the knitting yarns.

The requirements for disengaging loops from one another in the upper side in adjacent courses are as follows:

(1) As mentioned above, only bottom stitches, which form the lower side of a double-knit construction, are bonded to a surface of an elastic sheet, and top stitches, which form the upper side of the construction are maintained in a free, separate state to impart the characteristic of stretchability to the fabric.

(2) The beginning end of a sinker loop of each top stitch becomes a bottom stitch fixed onto the elastic sheet.

(3) When the first and second requirements are fulfilled, the top stitches are held in a stationary condition, relative to the bottom stitches, as tension is imparted directly on the bottom stitches, thereby causing the latter to change location in relation to the upper stitches.

Figure 3:
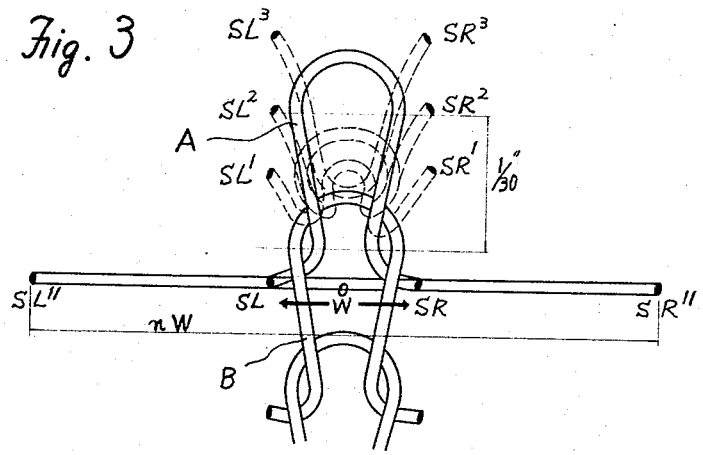
FIG. 3 is an enlarged diagrammatic view showing the step of the process wherein the stitch in one course of the upper side loops is being pulled through a stitch in an adjacent course of the upper side loops to provide a free loop for forming the "pile" in the finished fabric.

In FIG. 3, A denotes one top stitch at the end of the knit construction undergoing stretch or tensioning, and B is one top stitch of the preceding course which engages with the top stitch at the knitting construction edge.

Sinker loops of both ends of loop A are fixed on the elastic sheet normally with a spacing W, but when they are stretched, the ends are located respectively at $SR'$ and $SL'$. The sinker loops become the bottom stitches which are adhered to the face of the elastic sheet at points SR and SL.

The elatic sheet as well as the bottom stitches adhered thereto, when at the forward edge of the knit construction are therefore pulled and stretched in a direction of reeling by tension D. Thus, the points, SL, SR are transferred by stretching to points $SL^1$ and $SR^1$ to points $SL^2$ and $SR^2$, and then to $SL^3$ and $SR^3$, consecutively. The top loop B is unstretched; the top portion of loop A is gradually reduced, and the distances between the points and the interlooping of loops A and B become longer, thereby, as illustrated in dotted lines, the points reach $SL^3$ and $SR^3$ whereat the top end portion or crown of loop A comes out of the top end portion or crown of loop B.

The distance of stretch for disengaging the loop A from loop B is slightly greater than the length of one stitch. For example, when the number of longitudinal stitches 30 per inch, the bonded points should move a distance of at least $\frac{1}{30}$ of an inch. The top of loop A becomes gradually narrower until it comes out of the top of loop B. Because the loop B is pulled strongly, the length of the stitch increases while the width of the stitch becomes narrower; accordingly, in order to draw loop A from loop B, strong tension or pull is required. The degree of a tension imparted by merely reeling is not enough for disengagement of loops.

Figure 4:
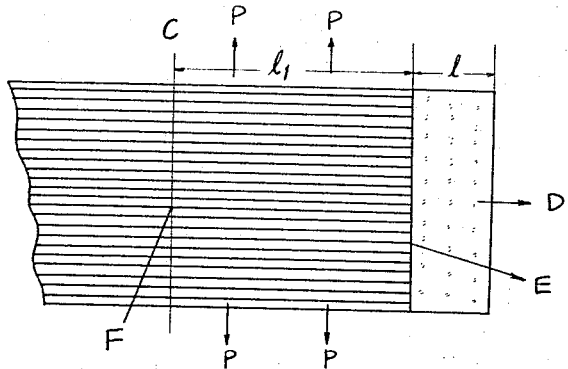
FIG. 4 is a diagrammatic plan view of the reeling end of the elastic fabric of the present invention.
Figure 5:
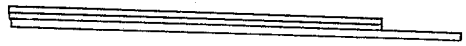
FIG. 5 is a side elevational view of FIG. 4.

According to this invention, the disengagement of loops is intended to progress uniformly in the illustrated range from E to F, i.e., in a distance of $l_1$ (FIG. 4). The linear reeling velocity at E is considerably higher than the linear reeling velocity at F, thereby causing a strong tension to occur on the fabric of $l_1$ to facilitate the disengagement.

When uniform tension is imparted on the whole width of fiber, a phenomenon occurs wherein the loops in the central portion can be pulled out more easily than the loops on both side portions, and, therefore, it is necessary to vary the amount of tension in the central portion from that of the side portions. Accordingly, in order to facilitate the drawing out of loops, a lateral tension P is imparted outwardly on both side edges of the portion $l_1$ of the sheet; thus, a so-called widening operation is performed. Top stitches A, B, etc. are widened as compared with the normal width of these stitches and the opening of top portions of the loops are enlarged. Thus, as in FIG. 3, the withdrawing of loop A from an opened loop B, with attachment points stretched to $SL''$ and $SR''$ locations, is made easily.

The above-mentioned loop disengagement operation progressively moves course by course from line E to line F, and as the lines E and F advance longitudinally in direction D by reeling while under stretching tension, the top stitches of the upper side of the whole knit construction become detached to form the pile-like face of the fabric when the sheet to which the construction is bonded on its lower side is released from tension to return to its normal non-stretched condition.

In the formation of the pile-like face in the present invention, the total loops of top stitches form the pile-like upper side, whereas in usual pile manufacturing, loops are formed with a separate yarn other than the stitch yarn.

FIG. 6 is an enlarged oblique view showing a part of the fabric wherein the engagement of the loop of each top stitch is detached and the loop is held upright. In said figure the hatched portion illustrates the bottom stitches adhered to the elastic sheet, and the unhatched portion represents top stitches detached from looped engagement with one another and standing upright.

Figure 7:
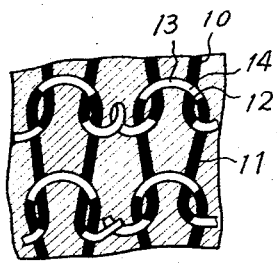
FIG. 7 is an enlarged plan view showing the bottom stitch of the double-knit cloth adhered to the surface of an elastic sheet, with the top stitches of the fabric being removed.
Figure 8:
FIG. 8 is a side elevational view of FIG. 7.

FIG. 7 is a plan view showing the lower side of the knit construction with the bottom stitches adhered to the elastic sheet and FIG. 8 is a side view thereof. In FIGS. 7 and 8, the blackened portions of bottom stitches indicate bonded portions, with the crown portion 13 of the loop of bottom stitch 11 being shown in white, to indicate that it is not bonded onto the elastic sheet 8; similarly, the back face of bottom stitch 10 intersecting loop 11 is not bonded. The sinker loop 15 from the bottom stitch 10 is shown in white, as it is not bonded, and also the back face of bottom stitch 11 intersecting and contacting therewith is not bonded. Thus, the bottom stitches 10 and 11 are not in mutual engagement, whereby mutual shifting is possible in the upward direction as viewed in FIG. 7.

Inasmuch as the sinker lop 15 of bottom stitch 10 is a continuation of a slackened loop of a top stitch, said sinker loop 15 is pulled until the slack disappears and a longitudinal shifting of the bottom stitch 10 is effected. In this case, the degree of extension corresponds to the degree of lateral stretch.

It is understood from the foregoing description, that the thin water-proof fabric of this invention shows the same large degree of stretch in both longitudinal and lateral directions. However, due to the above-mentioned functioning of bottom, sinker and top stitches, stretch of the fabric is possible in all directions.

The stretch amounts to about 4 times that of usual products because the top loops can be stretched, and then simultaneously rapidly contracted due to a strong restoring property of the sheets when released from tension.

The stretches actually measured are in the following examples:

(1) The longitudinal stretch for double-knit hosiery construction alone—1.15 times of the original length.

(2) The lateral stretch for a double-knit hosiery construction alone—1.40 times of the original width.

(3) The longitudinal stretch for a water-proof fabric prepared as by known methods wherein a rubber sheet is bonded onto a double-knit hosiery construction—1.15 times.

(4) The lateral stretch for a thin water-proof fabric prepared by known methods wherein a rubber sheet is bonded onto a double-knit hosiery construction—1.60 times.

(5) The longitudinal stretch for the thin water-proof fabric according to this invention—3.0 times of the original length.

(6) The lateral stretch for the thin water-proof fabric according to this invention—3.2 times of the original width.

(7) The stretch in an oblique direction of 45° for the thin water-proof fabric according to this invention—3.5 times oblique direction unstretched.

(8) The stretch for a rubber sheet alone—6.0 to 7.0 times of the original length.

It is also evident from the above examples that the thin water-proof fabric according to this invention exceeds by far ordinary water-proof fabrics in stretch, while at the same time, stretch is possible in all directions. In contrast, in other fabrics, a large difference is found in the stretch according to the direction of stretch.

Figure 9:
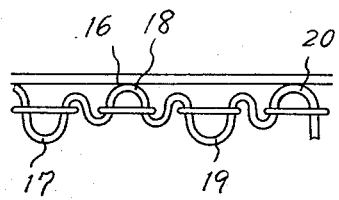
FIG. 9 is a schematic end view of a hosiery knitting pasted to an elastic sheet.

While the thin water-proof elastic fabric of the present invention has been described as employing a double-knit hosiery construction, other constructions than the double-knit construction may also be employed. Thus, as shown in FIG. 9, ordinary knits may be used.

In this case, since the crowns of top stitches 17, 19 are spaced from the crowns 16 of bottom stitches for application of an adhesive to the latter, only bottom stitches 18, 20 are adhered onto the elastic sheet. Accordingly, only top stitches 17, 19 are free from the elastic sheet to form a pile-like surface by detaching the engagement of loops similarly as described above.

In this case, the pile-like surface is inevitably coarser than the pile surface in the typical example, and as a result, the stretchability is lower. On the other hand, this method is quite adequate for making extremely thin goods. The thinnest grade hosiery knittings are tricot knit, however, as ordinary tricot constructions are found unsatisfactory in practicing this invention, a double-knit tricot construction is adopted.

Figure 10:
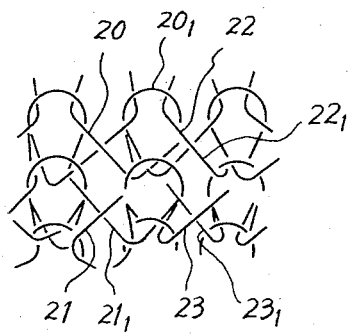
FIG. 10 is a schematic plan view of a double tricot knitting adapted to be pasted to an elastic sheet.

As illustrated in FIG. 10, sinker loops 20, 21, 22, 23—of the one side of the double-knit tricot construction are obliquely crossed with sinker loops $21_1$, $22_1$, $23_1$ of the other side of the knitting respectively, and as the stitches are relatively close-packed, the adhesive can be applied relatively easily. Moreover, since each loop is somewhat in relief on the reverse side, the sinker loop face in relief is bonded on the surface of the elastic sheet, followed by disengagement of loops to form a pile-like face.

Figure 11:
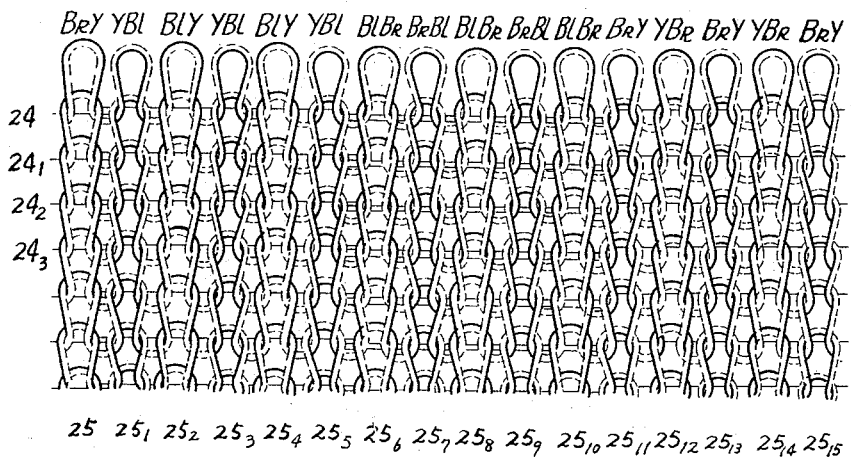
FIG. 11 is a diagrammatic plan view of a double-knit cloth wherein colored yarns are employed.

Several kinds of colored yarns may be used as knitting yarns, and variation is given to the contrast in color tone by a relief stitch wherein the relief stitch portion is made to come out simultaneously with the piling of the top stitches; thus, further improving the fabrics to provide a velvet-like water-proof fabric. For instance, as shown in FIG. 11, the stitches illustrated in full lines are top stitches, and those in dotted lines are bottom stitches. The notations at the top are names of dyed colors of knitting strings on a respective needle wale. In the drawing, *black* is abridged to Bl; *yellow* to Y and *brown* to Br.

The top stitch at wale $25_1$ is black and the bottom stitch is yellow. This color scheme continues alternately along course 24 through wale $25_5$. From wale $25_6$ through wale $25_{10}$, the top stitches and bottom stitches alternate in color between black and brown. From wale $25_{11}$ through wale $25_{15}$ the top stitches and the bottom stitches alternately are colored brown and yellow. The wales 25 through $25_{10}$ are provided with a relief stitch joining the top stitches and the bottom stitches.

The relief yarn in this case is distinguished from ordinary relief stitches by being nipped from the stitches between the top and bottom stitches. Thereby, on the operation of conversion of top stitches into a pile-like surface, the top stitches are converted without interference, and simultaneously the relief strings are pulled out to a considerable length from the surface to give varying surfaces, the combination of which displays a velvet-like beautiful appearance at first sight.

In the present invention, the elastic sheet may be, for example, a rubber sheet, polyvinyl chloride sheet, spongy rubber sheet, and spongy synthetic resin sheet.

The example of the embodiment of the present invention is explained as follows:

*The first step of operation.*—No. 42 count cotton yarn was used as a knitting string; the number of stitches in the longitudinal direction per inch was 30; the number of lateral needle wales was 33; a double-knit hosiery construction was formed into a cylinder, which was cut and unwound into sheet form to form a knitted construction of 1.15 meters wide and 50 meters long.

*The second step of operation.*—The above-mentioned double-knit hosiery construction was adhered with an adhesive, such as starch paste, onto one face of a temporary attaching sheet.

*The third step of operation.*—On the other face of the hosiery construction, a rubber adhesive was applied. On the tacky face of the adhesive, a thin rubber sheet of 0.23 mm. thickness and 1.1 m. width was pasted.

The rubber adhesive was maintained at a low fluidity and had the following composition: (The numerals in the table were weight ratios.)

| | |
|---|---|
| Fine crepe | 60.0 |
| Zinc oxide | 8.0 |
| Titanium white | 15.0 |
| Calcium carbonate | 10.0 |
| Stearic acid | 1.5 |
| White factis | 2.0 |
| Sulfur | 1.5 |
| Ageing preventing agent | 0.5 |
| Color agent | 1.0 |
| Accelerating agent | 0.5 |
| Gasoline | 15.0 |

When the rubber paste was applied, the linear velocity for reeling of the hosiery construction was increased from 12 m./min., the usual velocity, to 15 m. to 18 m./min. as a means for preventing the rubber adhesive from being overly supplied to the construction.

*The fourth step of operation.*—The temporary sheet pasted to the hosiery construction one face, the hosiery construction and the thin rubber sheet bonded to the other side of the hosiery construction by the rubber adhesive was then introduced into a vulcanizing room. The thin raw rubber sheet was vulcanized to impart elasticity, and then the temporary sheet was peeled off by washing in water. The resultant fabric then consists of a double-knit hosiery construction and a thin rubber sheet.

*The fifth step of operation.*—A reeling end consisting of a bare face of the elastic sheet was provided by peeling off a suitable length of hosiery construction at the end portion of the length of double-knit construction, and top and bottom stitches at the edge of the hosiery construction of one course at the reeling end of the fabric were disengaged from each other.

*The sixth step of operation.*—While the roll of fabric was being reeled off the supply roller, a predetermined stretching length of roll was successively presented on the fabric, and a strong tension was imparted on said length. Simultaneously, taking advantage of the stretch at the reeling end as well as the fact that the top and bottom stitches on the edge course were already released from their engagement, the movement of the bottom stitch whereby it was stretched in relation to the top stitch was effected, and loops of successive course of top stitches were freed from one another. The detached loops were released from stretch to stand upright by the restoring force of the elastic sheet as the loops passed through the stretching length, thus, allowing them to be packed closely to form a pile-like surface. The above-mentioned operations were contiguously advanced on a whole surface length of the roll.

Figure 13:
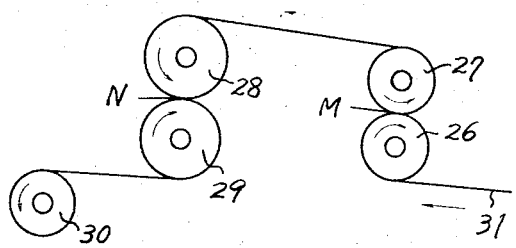
FIG. 13 is a schematic view of the reels employed for stretching the fabric to release the stitches of the upper side of the double-knit construction and in adjacent courses as illustrated in FIG. 3 to provide loops which form the pile in the finished fabric.

The apparatus used for the stretching step of the present invention is shown in FIG. 13 wherein the fabric 31 to be stretched is fed from a pair of feeding rollers 26 and 27 to a pair of stretching rollers 28 and 29, the feeding rollers contacting the fabric at point M, and the stretching rollers contacting the fabric at point N. After passing through the stretching range, the finished water-proof fabric is wound on roller 30.

With the rollers rotating in the direction of the arrows, a high longitudinal tension is imparted in the stretching range between the contact points M, N on the roll of fabric 31 by choosing the linear velocity for the rollers 28, 29 appropriately greater than the linear velocity for the rollers 26, 27; for instance, 25 to 1, with the tension imparted not exceeding the adhesive force between the bottom stitches and the elastic sheet.

By the construction and arrangement of the stretching range provided by the feed and stretching rollers, the fabric passing through the stretching range is stretched a sufficient amount to pull the top stitches in one course through the top stitches in the adjacent course to thereby provide loops which form the pile-like face of the finished fabric. As soon as the fabric passes through the stretching range onto the storage reel, the stretching force is released thereby allowing the elastic fabric to contract, whereby the loops are caused to stand upright and to be closely packed to form a pile-like surface.

Figure 12:
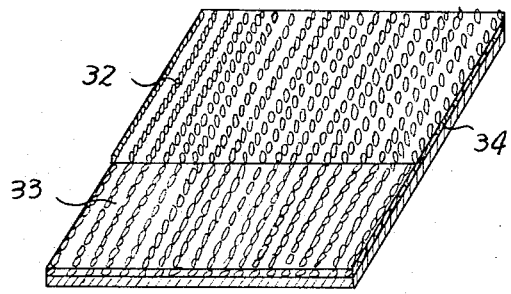
FIG. 12 is a diagrammatic perspective view illustrating the thin water-proof fabric of the present invention.

A piece of the water-proof fabric manufactured according to this invention is illustrated in FIG. 12, wherein a pile-like upper face 32 is shown, with the lower face consisting of bottom stitches 33 bonded onto a thin rubber sheet 34.

In place of an elastic sheet of rubber or polyvinyl chloride, a latex solution or synthetic resin solution may be applied on the back face of hosiery knittings, such as the double-knit constructions, and vulcanized or set by heating to thereby produce a thin water-proof fabric having a thin film of latex or synthetic resin. Such a process is particularly advantageous for use, wherein no sufficient water-proofness or elasticity is required, or wherein an extremely thin layer is required.

Inasmuch as the present invention is subject to a variety of modifications and changes in details, it is intended that all matter contained in the above description or shown on the accompanying drawings shall be interpreted as illustrative and not in a limiting sense.

What is claimed is:

1. A process for manufacturing a thin water-proof fabric with a pile-like face and being extensible in all directions, comprising the steps of forming a double-knit construction having a plurality of top stitches on the upper side and a plurality of bottom stitches on the lower side, adhesively securing said bottom stitches to an elastic sheet, stretching the elastic sheet and associated double-knit construction so as to pull the top stitches in one course through the top stitches in the adjacent course thereby provide free loops, releasing the stretching force from the elastic fabric to thereby contract the elastic sheet and causing the loops to stand upright and closely packed to form a pile-like fabric face.

2. The process as recited in claim 1 wherein said elastic sheet is made of rubber.

3. The process as recited in claim 1 wherein said elastic sheet is made of vinyl and said bottom stitches are secured thereto under heat and pressure.

4. The product manufactured by the process of claim 1.

5. A process as recited in claim 1 wherein the top stitches are temporarily adhered to a sheet before securing the bottom stitches to an elastic sheet and subsequently removed whereby the top stitches are unexposed to a securing medium during the securing of the elastic sheet to the bottom stitches.

6. A process as recited in claim 1 wherein the elastic sheet is a latex resin set by heat and bonded to the bottom stitches thereby.

7. A process as recited in claim 1 wherein the knit construction includes relief stitches which join top stitches with bottom stitches and are nipped so as to be pulled with the sheet during the stretching step to combine with the freed top loops in formation of a pile-like fabric face.

8. A product manufactured by the process of claim 7.

References Cited

"Manmade Textile Encyclopedia," by J. J. Press, New York, Textbook Publishers Inc., 1959.

ROBERT F. BURNETT, *Primary Examiner.*

ALEXANDER WYMAN, *Examiner.*

R. A. FLORES, L. M. CARLIN, *Assistant Examiners.*